(12) United States Patent
Singh et al.

(10) Patent No.: US 9,132,402 B2
(45) Date of Patent: Sep. 15, 2015

(54) APPARATUS, SYSTEMS, AND PROCESSES FOR PRODUCING SYNGAS AND PRODUCTS THEREFROM

(75) Inventors: Shashi Prakash Singh, Missouri City, TX (US); Arthur Joseph Price, Kingwood, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 1255 days.

(21) Appl. No.: 12/752,531

(22) Filed: Apr. 1, 2010

(65) Prior Publication Data

US 2011/0042620 A1 Feb. 24, 2011

Related U.S. Application Data

(60) Provisional application No. 61/235,639, filed on Aug. 20, 2009.

(51) Int. Cl.
*C01B 3/26* (2006.01)
*B01J 8/04* (2006.01)
(Continued)

(52) U.S. Cl.
CPC . *B01J 8/04* (2013.01); *C01B 3/025* (2013.01); *C01B 3/382* (2013.01); *C01B 3/384* (2013.01); *C01B 3/48* (2013.01); *B01J 2208/0053* (2013.01); *B01J 2219/0004* (2013.01); *B01J 2219/00006* (2013.01); *C01B 2203/0233* (2013.01); *C01B 2203/0244* (2013.01); *C01B 2203/0283* (2013.01); *C01B 2203/0405* (2013.01); *C01B 2203/047* (2013.01); *C01B 2203/0415* (2013.01); *C01B 2203/0445* (2013.01); *C01B 2203/0475* (2013.01); *C01B 2203/0495* (2013.01); *C01B 2203/068* (2013.01); *C01B 2203/0816* (2013.01); *C01B 2203/0822* (2013.01); *C01B 2203/0844* (2013.01); *C01B 2203/0894* (2013.01); *C01B 2203/1288* (2013.01);

(Continued)

(58) Field of Classification Search
USPC .................................. 252/373; 422/626, 627
See application file for complete search history.

(56) References Cited

U.S. PATENT DOCUMENTS 4,904,455 A 2/1990 Karafian et al.
5,181,937 A * 1/1993 Karafian et al. ................. 48/95

(Continued)

FOREIGN PATENT DOCUMENTS

| EP | 0227807 B1 | 11/1991 |
| WO | 2006/117499 A1 | 11/2006 |
| WO | 2008/122399 A1 | 10/2008 |

*Primary Examiner* — Stanley Silverman
*Assistant Examiner* — Syed Iqbal
(74) *Attorney, Agent, or Firm* — Gary M. Machetta (57) ABSTRACT

Apparatus, systems, and processes for reforming hydrocarbons are provided. The process can include reforming a first hydrocarbon in the presence of steam and one or more first catalysts in a first reformer to produce a first reformed hydrocarbon. The process can also include reforming the first reformed hydrocarbon in the presence of one or more second catalysts in a second reformer to produce a second reformed hydrocarbon. The process can also include reforming a second hydrocarbon in the presence of steam and one or more third catalysts in a third reformer to produce a third reformed hydrocarbon, where heat from the second reformed hydrocarbon is transferred to the second hydrocarbon to support reforming of the second hydrocarbon.

15 Claims, 2 Drawing Sheets

(51) Int. Cl.
  *C01B 3/02* (2006.01)
  *C01B 3/38* (2006.01)
  *C01B 3/48* (2006.01)

(52) U.S. Cl.
  CPC .... *C01B 2203/141* (2013.01); *C01B 2203/142* (2013.01); *C01B 2203/146* (2013.01); *C01B 2203/147* (2013.01); *C01B 2203/148* (2013.01); *C01B 2203/1604* (2013.01); *C01B 2203/84* (2013.01)

(56) References Cited

U.S. PATENT DOCUMENTS

| | | |
|---|---|---|
| 5,496,859 A | 3/1996 | Fong et al. |
| 7,670,586 B2 | 3/2010 | Wang et al. |
| 2007/0020492 A1* | 1/2007 | Labinov et al. ............ 429/17 |
| 2009/0038314 A1* | 2/2009 | Pearson ..................... 60/781 |

* cited by examiner

APPARATUS, SYSTEMS, AND PROCESSES FOR PRODUCING SYNGAS AND PRODUCTS THEREFROM

CROSS-REFERENCE TO RELATED APPLICATION

This application claims benefit of U.S. Provisional Patent Application having Ser. No. 61/235,639 filed on Aug. 20, 2009, which is incorporated by reference herein.

BACKGROUND

1. Field of the Invention

Embodiments of the present invention generally relate to apparatus, systems, and processes for producing syngas. More particularly, embodiments of the present invention relate to apparatus, systems, and processes for producing syngas and products therefrom.

2. Description of the Related Art

Syngas is typically the product of reforming a carbon containing material in the presence of steam and/or an oxidant at high temperatures. Depending on the starting materials, syngas is usually rich in carbon monoxide and hydrogen, and can also contain varying amounts of methane, carbon dioxide, nitrogen, and argon.

Conventional syngas preparation introduces a hydrocarbon to a fired steam reformer and contacts the hydrocarbon with a steam reforming catalyst. The primary reformed hydrocarbon is then introduced to a secondary reformer where hydrogen and unreformed hydrocarbons are partially oxidized with an oxidant and further reformed in the presence of a catalyst. The reforming steps are endothermic and require supplying substantial amounts of heat to the reformers in order for the reactions to proceed. The heat for the reforming reactions is usually provided by burning large amounts of high quality fuel, such as natural gas. Increasing the temperature of the secondary reformer can provide a higher conversion of the hydrocarbon to syngas, but doing so requires oxidizing more fuel in the secondary reformer and/or more fuel used to fire the primary reformer.

There is a need, therefore, for improved apparatus, systems, and processes for reforming hydrocarbons to produce a syngas while reducing equipment cost, equipment size, and fuel.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Apparatus, systems, and processes for reforming hydrocarbons are provided. In one or more embodiments, the process can include reforming a first hydrocarbon in the presence of steam and one or more first catalysts in a first reformer to produce a first reformed hydrocarbon. The first hydrocarbon can include about 65 mol % or more methane and about 30 mol % or less hydrogen. The first reformed hydrocarbon can include from about 30 mol % to about 60 mol % methane and from about 30 mol % to about 55 mol % hydrogen. The process can also include reforming the first reformed hydrocarbon in the presence of one or more second catalysts in a second reformer to produce a second reformed hydrocarbon. The second reformed hydrocarbon can include about 10 mol % or less methane and from about 40 mol % to about 60 mol % hydrogen. The process can also include reforming a second hydrocarbon in the presence of steam and one or more third catalysts in a third reformer to produce a third reformed hydrocarbon, where heat from the second reformed hydrocarbon is transferred to the second hydrocarbon to support reforming of the second hydrocarbon. The second hydrocarbon can include about 65 mol % or more methane and about 30 mol % or less hydrogen. The third reformed hydrocarbon can include about 10 mol % or less methane and from about 45 mol % to about 80 mol % hydrogen.

Figure 1:
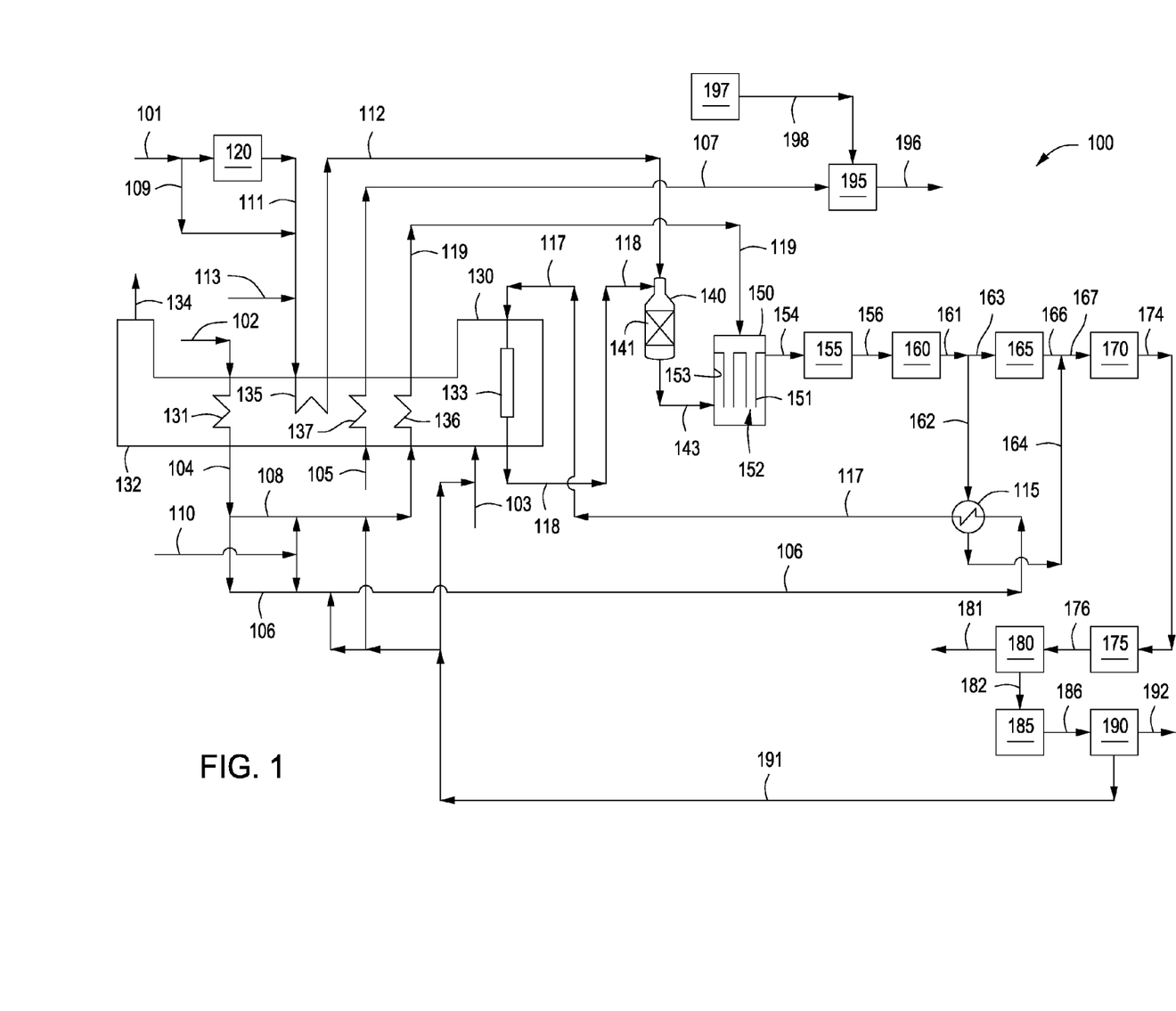
FIG. 1 depicts an illustrative system for producing syngas and ammonia, according to one or more embodiments described.

FIG. 1 depicts an illustrative system 100 for producing syngas and ammonia therefrom, according to one or more embodiments. A hydrocarbon via line 102 can be heated to provide a preheated hydrocarbon via line 104. For example, the hydrocarbon in line 102 can be preheated via a heater coil 131 disposed within an exhaust duct 132 of the first reformer 130 to provide a preheated hydrocarbon via line 104. Heated exhaust gas can pass across one or more heating coils 131, with the exhaust gas exiting the exhaust duct 132 via line 134. The hydrocarbon in line 104 can be heated to a temperature ranging from about 200° C. to about 350° C., for example. Although not shown, the hydrocarbon via line 104 can be further heated in one or more additional heat exchangers. For example, the hydrocarbon via line 104 can be indirectly heated using steam generated in a downstream processing step, such as steam generated from heat produced in a shift converter 160. Further heating the hydrocarbon in line 104 using steam generated in a downstream processing step or an independent heater can be carried out to provide a hydrocarbon in line 104 having a temperature ranging from a low of about 320° C., about 330° C., or about 340° C. to a high of about 390° C., about 400° C., or about 425° C. However, the hydrocarbon in line 102 can be heated to a temperature of from about 340° C. to about 425° C. via the heating coil 131.

The hydrocarbon in line 102 can include one or more liquid or gaseous hydrocarbons, mixtures thereof, or any combination thereof. The hydrocarbon in line 102 can include any one or more $C_1$ to $C_{12}$ hydrocarbons, hydrogen, or any combination thereof. For example, the hydrocarbon in line 102 can include methane, ethane, propane, butane, pentane, hexane, hydrogen, or any combination thereof. The methane concentration in the hydrocarbon in line 102 can range from a low of about 30 mol %, about 50 mol %, or about 75 mol % to a high of about 95 mol %, about 99 mol %, or about 99.9 mol % with the balance including $C_2$, $C_3$, and heavier hydrocarbons. For example, the hydrocarbon in line 102 can have a methane concentration of about 55 mol % or more, about 60 mol % or more, about 65 mol % or more, about 70 mol % or more, about 75 mol % or more, about 80 mol % or more, about 85 mol % or more, or about 90 mol % or more. The hydrogen concentration in the hydrocarbon in line 102 can range from a low of about 0.1 mol %, about 1 mol %, or about 5 mol % to a high of about 20 mol %, about 30 mol %, or about 35 mol %. For example, the hydrocarbon in line 102 can have a hydrogen concentration of about 30 mol % or less, about 25 mol % or less, about 20 mol % or less, about 15 mol % or less, about 10 mol % or less, about 5 mol % or less, or about 1 mol % or less.

The pressure of the hydrocarbon in line 102 can range from a low of about 700 kPa, about 1,000 kPa, or about 1,400 kPa to a high of about 4,000 kPa, about 5,000 kPa, or about 6,000 kPa. The hydrocarbon in line 102 can have a heating value ranging from a low of about 30,000 $kJ/m^3$, about 35,000 $kJ/m^3$, or about 40,000 $kJ/m^3$ to a high of about 50,000 $kJ/m^3$, about 55,000 $kJ/m^3$, or about 60,000 $kJ/m^3$. For example, the hydrocarbon in line 102 can have a heating value of about 33,000 $kJ/m^3$, about 36,000 $kJ/m^3$, or about 39,000 $kJ/m^3$.

The preheated hydrocarbon via line 104 can be split or divided to provide a first hydrocarbon via line 106 and a second hydrocarbon via line 108. Prior to dividing the preheated hydrocarbon in line 104, the preheated hydrocarbon can be desulfurized in one or more desulfurization units (not shown). Steam via line 110 can be introduced to the first hydrocarbon in line 106 and/or to the second hydrocarbon in line 108. The first hydrocarbon in line 106 and the second hydrocarbon in line 108 can have a steam-to-carbon molar ratio (or steam-to-carbon content of the first hydrocarbon) ranging from a low of about 2.6, about 2.7, about 2.8, or about 2.9 to a high of about 3.1, about 3.2, about 3.4, about 3.5, or about 3.6. Although not shown, the steam via line 110 can be introduced to the hydrocarbon in line 102 prior to preheating the hydrocarbon in the coils 131. However, introducing the steam to the first hydrocarbon via line 106 and the second hydrocarbon via line 108 can provide or allow for different hydrocarbon-to-steam molar ratios between the first hydrocarbon in line 106 and the second hydrocarbon in line 108. For example, the first hydrocarbon in line 106 can have a steam-to-hydrocarbon molar ratio of from about 2.9 to about 3 and the second hydrocarbon in line 108 can have a steam-to-hydrocarbon molar ratio of from about 3 to about 3.1.

Although not shown, hydrogen can be introduced to the first hydrocarbon in line 106 and/or the second hydrocarbon in line 108. The hydrogen can be provided, produced, or otherwise obtained from any suitable source located within the system 100 or from outside the system 100, i.e. inside battery limits ("ISBL") or outside battery limits ("OSBL"). For example, as discussed below, at least a portion of the hydrogen that can be introduced to the first hydrocarbon in line 106 and/or the second hydrocarbon in line 108 can be provided from one or more down stream purge gases via line 191. The hydrogen concentration in the first hydrocarbon in line 106 and/or the second hydrocarbon in line 108 can range from a low of about 0 mol %, about 1 mol %, about 2 mol %, or about 3 mol % to a high of about 5 mol %, about 7 mol %, about 8 mol %, or about 10 mol %. Hydrogen can be initially present in or introduced to the hydrocarbon in line 102. However, introducing the hydrogen to the first hydrocarbon in line 106 and/or the second hydrocarbon in line 108 can provide a first hydrocarbon and a second hydrocarbon having different hydrogen concentrations with respect to one another. For example, the first hydrocarbon in line 106 can have a hydrogen concentration ranging from about 1 mol % to about 5 mol % and the second hydrocarbon in line 108 can have a hydrogen concentration ranging from about 1 mol % to about 5 mol %.

The first hydrocarbon in line 106 can include from about 50% to about 90% of the total amount of the hydrocarbon in line 104. The second hydrocarbon in line 108 can include from about 10% to about 50% of the total amount of the hydrocarbon in line 104. For example, the first hydrocarbon in line 106 can include from about 40% to about 80% of the total amount of the hydrocarbon in line 104 and the second hydrocarbon in line 108 can include from about 20% to about 40% of the total amount of the hydrocarbon in line 104. In another example, the amount of the first hydrocarbon in line 106 can be about equal to or up to about nine times more than the amount of the second hydrocarbon in line 108. As such, the first hydrocarbon in line 106 and the second hydrocarbon in line 108 can be different from one another, derived from different sources, or the like.

The first hydrocarbon via line 106 can be indirectly heated in a heat exchanger 115 to produce a heated hydrocarbon via line 117. Heat from a shift converted syngas via line 162, steam (not shown), or any other source (not shown) can be introduced to the heat exchanger 115, where heat can be indirectly transferred from the shift converted syngas product to the first hydrocarbon. The heated first hydrocarbon in line 117 can be at a temperature ranging from a low of about 375° C., bout 390° C., or about 400° C. to a high of about 425° C., about 435° C., about 450° C., or about 475° C.

The first hydrocarbon in line 117 can be reformed in the presence of steam and one or more first catalysts in a first reformer 130 to produce a first reformed hydrocarbon via line 118. For example, the first hydrocarbon via line 117 can be introduced to one or more catalyst-containing tubes 133 disposed within the first reformer 130 to produce the first reformed hydrocarbon via line 118.

The first reformed hydrocarbon in line 118 can contain hydrogen, carbon monoxide, carbon dioxide, methane, or any combination thereof. The first reformed hydrocarbon in line 118 can include an increased amount of hydrogen and a decreased amount of methane as compared to the first hydrocarbon in line 106. The first reformed hydrocarbon in line 118 can have a hydrogen concentration ranging from a low of about 30 mol %, about 35 mol %, or about 40 mol % to a high of about 45 mol %, about 50 mol %, or about 55 mol %. The first reformed hydrocarbon in line 118 can have a methane concentration ranging from a low of about 30 mol %, about 35 mol %, or about 40 mol % to a high of about 45 mol %, about 55 mol %, about 60 mol %, or about 65 mol %. The first reformed hydrocarbon in line 118 can have a carbon monoxide concentration ranging from a low of about 0.5 mol %, about 1 mol %, or about 2 mol % to a high of about 3 mol %, about 4 mol %, or about 5 mol %. The first reformed hydrocarbon in line 118 can have a carbon dioxide concentration ranging from a low of about 5 mol %, about 7%, or about 9 mol % to a high of about 12 mol %, about 15 mol %, or about 17 mol %. The first reformed hydrocarbon in line 118 can have a hydrogen concentration of from about 40 mol % to about 50 mol %, a methane concentration of from about 35 mol % to about 45 mol %, a carbon monoxide concentration of from about 1 mol % to about 2 mol %, a carbon dioxide concentration of from about 8 mol % to about 12 mol %, with other components such as $C_2$ and heavier hydrocarbons being absent or minimally present, for example at less than about 5 mol %, less than about 4 mol %, less than about 3 mol %, less than about 2 mol %, or less than about 1 mol %.

The first reformed hydrocarbon in line 118 can have a temperature ranging from a low of about 590° C., about 600° C., about 610° C., or about 620° C. to a high of about 630° C., about 640° C., or about 650° C. For example, the first reformed hydrocarbon in line 118 can have a temperature of from about 590° C. to about 640° C., about 590° C. to about 630° C., about 590° C. to about 620° C., or about 590° C. to about 610° C. The pressure of the first reformed hydrocarbon in line 118 can range from a low of about 700 kPa, about 1,000 kPa, or about 1,400 kPa to a high of about 4,000 kPa, about 5,000 kPa, or about 6,000 kPa.

The first reformed hydrocarbon in line 118 can be further reformed in the presence of one or more second catalysts in a second reformer 140 to produce a second reformed hydrocarbon via line 143. For example, the first reformed hydrocarbon via line 118 can be introduced to the second reformer which can be an autothermal reformer ("ATR") 140. An oxidant, such as oxygen enriched air, can be introduced via line 112 to the ATR 140. The oxygen enriched air introduced via line 112 can be used to partially combust a portion of the first reformed hydrocarbon introduced via line 118 to provide heat that drives an endothermic reforming reaction within one or more catalyst beds 141 disposed within the ATR 140. The ATR 140 can produce the second reformed hydrocarbon via line 143. The second reformed hydrocarbon in line 143 can have a temperature ranging from a low of about 950° C., about 975° C., or about 1,000° C. to a high of about 1,050° C., about 1,075° C., or about 1,100° C. The pressure of the second reformed hydrocarbon in line 143 can range from a low of about 700 kPa, about 1,000 kPa, or about 1,400 kPa to a high of about 4,000 kPa, about 5,000 kPa, or about 6,000 kPa.

The second reformed hydrocarbon in line 143 can contain hydrogen, carbon monoxide, carbon dioxide, nitrogen, and other minor components, such as argon and/or methane. The second reformed hydrocarbon in line 143 can have a hydrogen concentration ranging from a low of about 35 mol %, about 40 mol %, about 43 mol %, or about 45 mol % to a high of about 53 mol %, about 55 mol %, about 60 mol %, or about 65 mol %. The second reformed hydrocarbon in line 143 can have a methane concentration less than about 10 mol %, less than about 8 mol %, less than about 6 mol %, less than about 4 mol %, less than about 2 mol %, less than about 1 mol %, less than about 0.5 mol %, less than about 0.3 mol %, or less than about 0.2 mol %. For example, the methane concentration of the second reformed hydrocarbon can range from about 0.1 mol % to about 0.5 mol %, about 0.3 mol % to about 1 mol %, or about 0.6 mol % to about 1.6 mol %. The second reformed hydrocarbon in line 143 can have a carbon monoxide concentration ranging from a low of about 7 mol %, about 9 mol %, or about 11 mol % to a high of about 13 mol %, about 15 mol %, or about 17 mol %. The second reformed hydrocarbon in line 143 can have a carbon dioxide concentration ranging from a low of about 7 mol %, about 9 mol %, or about 11 mol % to a high of about 13 mol %, about 15 mol %, or about 17 mol %. The second reformed hydrocarbon in line 143 can have a nitrogen concentration ranging from a low of about 10 mol %, about 25 mol %, or about 30 mol % to a high of about 35 mol %, about 37 mol %, or about 40 mol %. In at least one specific embodiment, the second reformed hydrocarbon in line 143 can have a hydrogen concentration of from about 10 mol % to about 50 mol %, a carbon monoxide concentration of from about 9 mol % to about 12 mol %, a carbon dioxide concentration of from about 9 mol % to abut 12 mol %, a nitrogen concentration of about 12 mol % to about 40 mol %, and a methane concentration of less than about 1 mol %.

Prior to introducing the oxygen enriched air via line 112 to the second reformer 140, the oxygen enriched air can be preheated to a temperature of from about 375° C. to about 475° C. For example, the oxygen enriched air via line 111 can be introduced to a heating coil 135 disposed within the exhaust duct 132 of the first reformer 130. As shown, the oxygen enriched air can be provided from air introduced via line 101 to an air absorption unit 120, which can separate at least a portion of the nitrogen and/or other components from the air to provide oxygen enriched air via line 111. The oxygen enriched air can contain about 21 vol % oxygen to about 40 vol % oxygen. In one or more embodiments, air via line 109 can bypass the air absorption unit 120 and can be introduced to line 111, which can then be heated in coil 135. Steam via line 113 can be introduced to the oxidant in line 111 (as shown) and/or to the preheated oxidant in line 112 to provide an oxidant and steam mixture. The amount of steam via line 113 introduced to the oxidant in line 111 can produce an oxidant that contains about 1 vol %, about 3 vol %, about 5 vol %, about 7 vol %, or about 10 vol % steam. Although not shown, steam via line 113 can be introduced directly to the second reformer 140, rather than to the oxidant in line 111 or the preheated oxidant in line 112.

The second hydrocarbon in line 108 can be heated. For example, the second hydrocarbon via line 108 can be introduced to a heating coil 136 disposed within the exhaust duct 132 of the first reformer 130 to produce a heated second hydrocarbon via line 119. The heated second hydrocarbon via line 119 can have a temperature ranging from a low of about 475° C., about 500° C., or about 525° C. to a high of about 575° C., about 600° C., or about 625° C.

The second hydrocarbon in line 119 can be reformed in a third reformer 150 to produce a third reformed hydrocarbon. For example, the heated second hydrocarbon via line 119 can be introduced to a tube-side inlet of the reforming exchanger 150 to provide a third reformed hydrocarbon via an exit 152 from one or more catalyst-containing tubes 151.

The third reformed hydrocarbon provided from the one or more exits or openings 152 from the one or more catalyst-containing tubes 151 can contain hydrogen, carbon monoxide, carbon dioxide, and other minor components, such as methane. The third reformed hydrocarbon via the catalyst-containing tubes 151 can have a hydrogen concentration ranging from a low of about 45 mol %, about 50 mol %, about 55 mol %, about 60 mol %, about 65 mol %, about 67 mol %, or about 69 mol % to a high of about 75 mol %, about 77 mol %, or about 80 mol %. For example, the third reformed hydrocarbon via the catalyst-containing tubes 151 can have a hydrogen concentration ranging from about 45 mol % to about 80 mol %, or about 55 mol % to about 80 mol %, or abut 60 mol % to about 80 mol %. The third reformed hydrocarbon via the catalyst-containing tubes 151 can have a methane concentration less than about 10 mol %, less than about 8 mol %, less than about 5 mol %, less than about 3 mol %, less than about 2 mol %, less than about 0.5 mol %, or less than about 0.2 mol %. For example, the methane concentration of the third reformed hydrocarbon can range from about 1 mol % to about 3 mol %. The third reformed hydrocarbon via the catalyst-containing tubes 151 can have a carbon monoxide concentration ranging from a low of about 12 mol %, about 13 mol %, or about 14 mol % to a high of about 15 mol %, about 16 mol %, or about 17 mol %. The third reformed hydrocarbon via the catalyst-containing tubes 151 can have a carbon dioxide concentration ranging from a low of about 5 mol %, abut 6 mol %, or about 7 mol % to a high of about 8 mol %, about 9 mol %, or about 10 mol %. In at least one specific embodiment, the third reformed hydrocarbon via the catalyst-containing tubes 151 can have a hydrogen concentration of from about 70 mol % to about 78 mol %, a carbon monoxide concentration of from about 12 mol % to about 16 mol %, a carbon dioxide concentration of from about 6 mol % to about 8 mol %, a methane concentration of less than about 2 mol %.

The second reformed hydrocarbon via line 143 can be introduced to a shell-side 153 of the reforming exchanger 150. The second reformed hydrocarbon introduced via line 143 can be mixed with the third reformed hydrocarbon within the shell-side 153 of the reforming exchanger 150 to provide a mixed reformed hydrocarbon product or syngas product. Although not shown, the third reformed hydrocarbon and the second reformed hydrocarbon can remain separated, i.e. independent from one another. For example, the second reformed hydrocarbon can be maintained separate from the third reformed hydrocarbon recovered via the exits 152 of the tubes 151 by a tube sheet, for example. Although not shown, the third reformed hydrocarbon and the second reformed hydrocarbon can be mixed with one another outside the reforming exchanger 150.

Heat required for endothermic reforming reactions within the catalyst-containing tubes 151 of the reforming exchanger 150 can be provided from the second reformed hydrocarbon. The second reformed hydrocarbon introduced via line 143, either alone or mixed or otherwise combined with the third reformed hydrocarbon, can flow along the outside of the one or more catalyst-containing tubes 151, thereby indirectly transferring heat from the second reformed hydrocarbon to the second hydrocarbon introduced via line 119 to the reforming exchanger 150.

As shown in FIG. 1, the second reformed hydrocarbon introduced via line 143 to the third reformer 150 and the third reformed hydrocarbon provided via the exit(s) or opening(s) 152 from the one or more catalyst-containing tubes 151 can be mixed within the shell-side 153 of the third reformer to provide a reformed product or syngas. The syngas can be recovered from the shell-side 153 of the third reformer via line 154. However, as mentioned above, depending on the particular design of the reforming exchanger 150, the second reformed hydrocarbon and the third reformed hydrocarbon can remain independent of one another or mixed outside the reforming exchanger 150. For example, a tube sheet can be disposed between the introduction of the second reformed hydrocarbon to the shell-side 153 of the third reformer and the exit(s) or openings) 152 from the one or more catalyst containing tubes 151.

The syngas via line 154 can have a temperature ranging from a low of about 650° C., about 660° C., or about 670° C. to a high of about 775° C., about 800° C., or about 825° C. The syngas in line 154 can have a hydrogen concentration ranging from a low of about 45 mol %, about 47 mol %, or about 50 mol % to a high of about 55 mol %, about 57 mol %, about 60 mol %, or about 65 mol %. The syngas in line 154 can have a carbon monoxide concentration ranging from a low of about 9 mol %, about 11 mol %, or about 12 mol % to a high of about 13 mol %, about 14 mol %, or about 15 mol %. The syngas in line 154 can have a carbon dioxide concentration ranging from a low of about 6 mol %, about 7 mol %, or about 8 mol % to a high of about 10 mol %, about 11 mol %, or about 12 mol %. The syngas in line 154 can have a nitrogen concentration ranging from a low of about 20 mol %, about 23 mol %, or about 25 mol % to a high of about 35 mol %, about 37 mol %, or about 40 mol %. The syngas in line 154 can have a methane concentration of less than about 10 mol %, less than about 8 mol %, less than about 6 mol %, less than about 4 mol %, less than about 3 mol %, less than about 2 mol %, less than about 1 mol %, or less than about 0.5 mol %. For example, the methane concentration of the syngas in line 154 can range from about 0.3 mol % to about 2 mol %.

The first reformer 130 can be steam-methane reformer ("SMR") that can include a combination of radiant and/or convective reformers that operate at a relatively low heat duty. The first reformer 130 can be referred to as a "lite" reformer. For example, the first or lite reformer 130 can operate at a temperature of from about 590° C. to about 650° C., for example from about 615° C. to about 620° C., and can have a heat output of from about 90 MMBTU/hr to about 120 MMBtu/hr, for a 1500 t/d ammonia plant. In one or more embodiments, about 40% or more, about 45% or more, about 50% or more, or about 55% or more of the heat produced within the first reformer 130 can be utilized for reforming the first hydrocarbon introduced via line 117. For example, from about 55% to about 65%, about 55% to about 70%, or about 50% to about 65% of the heat produced within the first reformer 130 can be utilized for reforming the first hydrocarbon introduced via line 117. The amount of fuel required to generate the necessary heat within the first reformer 130 can range from a low of about 135 MMBtu/hr, about 140 MMBtu/hr, or about 145 MMBtu/hr to a high of about 160 MMBtu/hr, about 170 MMBtu/hr, or about 180 MMBtu/hr for a 1,500 t/d ammonia plant.

The fuel combusted to generate the heat within the first reformer 130 can include low grade fuel sources rather than fresh natural gas or other high quality hydrocarbon feeds. Suitable low grade fuel sources can include, but are not limited to, biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. Other suitable low grade fuel sources can include off-gases produced from the gasification of biomass (i.e. plant and/or animal matter and/or plant and/or animal derived matter), coal (e.g. high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g. hydrocarbon waxes, blends thereof, and combinations thereof), hydrocarbon-based polymeric materials, petroleum coke, or any combination thereof. The hydrocarbon-based polymeric materials can include, but are not limited to, thermoplastics, elastomers, rubbers, polypropylenes, polyethylenes, polystrenes, other polyolefins, homo-polymers, co-polymers, block co-polymers, polyethylene terephthalate, poly blends, or any combination thereof.

Use of a low grade fuel can reduce the demand and requirements for a high grade and/or fresh hydrocarbon that can be converted to the syngas in line 154 via the reformers 130, 140, 150. Use of low grade fuel can provide substantial cost reductions, increased flexibility in the operation of the system 100, and/or allow for an increase in the amount of syngas produced from the system 100, while still only requiring the same amount of hydrocarbon via line 102 to produce the syngas via line 154. For example, existing plants require a portion of the hydrocarbon in line 102 to heat the first reformer 130, which generates heat rather than syngas product via line 154. The first reformer 130 can be adapted or modified or constructed to operate on the lower grade fuel, thereby allowing as much of the high grade hydrocarbon in line 102 as possible to be converted to the syngas in line 154.

The low grade fuel used to provide heat in the first reformer 130 can have a heating value ranging from a low of about 50 kJ/m$^3$, about 1090 kJ/m$^3$, or about 500 kJ/m$^3$ to a high of about 7,450 kJ/m$^3$, about 9,300 kJ/m$^3$, or about 10,250 kJ/m$^3$. For example, the low grade fuel used to provide heat in the first reformer 130 can have a heating value of about 50 kJ/m$^3$ to about 100 kJ/m$^3$, about 50 kJ/m$^3$ to about 2,794 kJ/m$^3$; about 400 kJ/m$^3$ to about 3,726 kJ/m$^3$; about 1,000 kJ/m$^3$ to about 4,098 kJ/m$^3$; about 1,500 kJ/m$^3$ to about 5,516 kJ/m$^3$; about 1,800 kJ/m$^3$ to about 6,707 kJ/m$^3$; about 1,300 kJ/m$^3$ to about 7,452 kJ/m$^3$; about 1,100 kJ/m$^3$ to about 9,315 kJ/m$^3$; or about 1,863 kJ/m$^3$ to about 10,246 kJ/m$^3$. The low grad fuel can have components that are normally unsuitable for use as process feed to stock in a reforming process.

The first reformer 130 can include a plurality of radiantly heated, single walled, catalyst-containing tubes 133. The first reformer 130 can include about 25 or more tubes, about 50 or more tubes, about 75 or more tubes, about 100 or more tubes, about 200 or more tubes, about 400 or more tubes, about 500 or more tubes, about 600 or more tubes, about 700 or more tubes, about 800 or more tubes, about 900 or more tubes, or about 1,000 or more tubes. The tubes can have an inside diameter ranging from a low of about 40 mm, about 50 mm, or about 65 mm to a high of about 90 mm, about 100 mm, about 125 mm, about 150 mm, about 200 mm or more. For example, the inner diameter of one or more tubes can be about 125 mm, about 150 mm, or about 175 mm. The diameter of the one or more catalyst tubes can reduce or minimize the radial temperature gradient of the tubes. The first reformer 130 can also include one or more convective sections, e.g. the exhaust duct 132 that can be used to heat one or more feeds. The one or more convective sections can use heat generated from the radiant section as a heating source.

The first reformer 130 can be a revamped or modified traditional SMR or other primary reformer used to produce syngas. For example, the burners tips within a traditional SMR can be replaced with a differently designed burner tip that can reduce the firing requirements of the first reformer 130 as compared to a traditional SMR and can be designed to uniformly distribute heat in the revamped or first reformer 130 configuration. However, modification of the burner tips can maintain enough heat output or heating capacity that the system 100 can be operated to produce ammonia should an oxygen supply be reduced or fail. Other modifications can include using a promoted catalyst, for example an alkalized nickel catalyst can be disposed within the upper or first 20-50% of the tubes 133 within the first reformer 130. Modifying or revamping an existing SMR can reduce the heat flux required by the first reformer 130 to about 25% to about 30% of the heat duty required in a traditional SMR. Any existing primary reformer can be revamped or modified to operate under the conditions of the first reformer 130. Those reformers can include top-fired furnaces, side-fired furnaces, terrace wall reformers, bottom fired reformer furnaces, or the like.

As mentioned above, the second reformer 140 can be an autothermal reformer. For example, the second reformer 140 can include one or more of the catalyst beds 141, which can at least partially reform the first reformed hydrocarbon introduced via line 118. The one or more catalyst beds 141 can include a single type of catalyst or a mixture of different types of catalyst. In another example, the catalyst bed 141 can include two catalyst beds 141 with a first catalyst bed having a first catalyst and a second catalyst bed having a second catalyst that is different from the first catalyst. The one or more oxidants via line 112 can be introduced to a burner within the ATR, which can combust a portion of the first reformed hydrocarbon introduced via line 118 to provide heat that can be used to further endothermically reform at least a portion of the first reformed hydrocarbon within the one or more catalyst beds 141.

The reforming exchanger 150 can be any type of reforming exchanger and are well known in the art. As illustrated, the reforming exchanger 150 can be a shell-and-tube type exchanger that includes one or more tubes 151 at least partially disposed within the shell-side 153 of the reforming exchanger 150. One or more catalysts can be disposed within the one or more tubes 151 to provide the one or more catalyst-containing tubes 151. The one or more catalyst-containing tubes 151 can be arranged in any pattern or configuration within the shell of the reforming exchanger 150. Although not shown, the catalyst-containing tubes 151 can include, but are not limited to, one or more fins, static mixers, rifling, heat conductive packing, turbulence causing projections, or any combination thereof, disposed on the external surface and/or the internal surface of the catalyst-containing tubes 151. The one or more catalyst-containing tubes 151 can be of various types, for example, straight tubes, bayonet tubes (not shown), U-tubes (not shown), coiled tubes (not shown), or any combination thereof. The one or more catalyst-containing tubes 151 can be disposed in vertical, horizontal, or at any other angle within the reforming exchanger 150. The one or more reforming exchangers can include a KBR Reforming Exchanger System ("KRES"). Additional KRES process conditions, catalysts, and other details can be found in U.S. Pat. Nos. 5,011,625; 5,122,299; 5,362,454; 6,855,272; 7,138,001; and 7,220,505, which are fully incorporated by reference herein. Additional reforming exchanger types, catalyst types, process conditions, and other details can be found in U.S. Pat. Nos. 7,074,347 and 6,224,789, which are incorporated by reference herein.

The one or more catalysts disposed in the catalyst-containing tubes 133 disposed within the first reformer 130, the one or more catalyst beds 141 disposed within the ATR 140, and the one or more catalyst-containing tubes 151 disposed within the reforming exchanger 150 can be the same or different, with respect to one another. Suitable catalysts can include, but are not limited to, noble metals, cobalt, nickel, oxides thereof, derivatives therefore, or combinations thereof. The one or more catalysts can be supported by one or more support materials. The one or more support materials can include, but are not limited to, alumina, refractory alumina, magnesium aluminate, calcium aluminate, calcium aluminate titanate, zirconia, cerium modified zirconia, or any combination thereof. An illustrative catalyst including nickel can have a nickel concentration ranging from a low of about 5 percent by weight ("wt %"), about 10 wt %, or about 12 wt % to a high of about 15 wt %, about 20 wt %, or about 25 wt %. The catalysts can be prepared in any desired shape or form by a variety of methods, for example, briquetting, tabletting, etc. The shape of the catalyst can be in the form of extruded, briquetted or tabletted cylinders, polylobal extrusions, spheres, rings, hollow core cylinders, solid cylinders, hollow core cylinders with grooves on the inside and/or outside surfaces, or any other appropriate geometric shape.

Referring again to the syngas in line 154, the syngas can be further processed to provide one or more products, such as ammonia. The syngas via line 154 can be introduced to a first waste heat boiler ("WHR") unit 155, which can indirectly transfer a portion of the heat from the syngas to a heat transfer medium, for example boiler feed water (not shown) to provide a cooled syngas via line 156. The cooled syngas via line 156 can be introduced to one or more shift converter systems 160 to provide a shift converted syngas via line 161. In at least one specific embodiment, at least a portion of the shift converted syngas in line 161 can be introduced via line 162 to the heat exchanger 115, where heat can be transferred from the shift converted syngas to the first hydrocarbon introduced via line 106 to provide the heated first hydrocarbon via line 117 and a first cooled shift converted syngas via line 164. However, other heat transfer mediums, such as steam generated in the first WHR unit 155 or the second WHR unit 165, or other source can be used to provide the heated first hydrocarbon via line 117. At least a portion of the shift converted syngas in line 161 can be introduced via line 163 to a second WHR unit 165 which can indirectly transfer a portion of the heat from the syngas to a heat transfer medium, for example boiler feed water (not shown) to produce a second cooled shift converted syngas via line 166. Although not shown, the WHR unit 155 and/or WHR unit 165 can include direct quenching to provide the cooled syngas via line 156 and/or 166. For example, boiler feed water can be directly introduced and mixed with the syngas introduced via line 154 to the WHR unit 155 and/or the shift converted syngas introduced via line 163 to the WHR unit 165. The shift converter 160 can be a high temperature shift converter ("HTSC") that can be operated at an inlet temperature of from about 380° C. to about 450° C. to provide a shift converted syngas having a temperature of from about 445° C. to about 500° C.

As illustrated, a first portion of the shift converted syngas via line 162 can be introduced to the heat exchanger 115 and a second portion of the shift converted syngas via line 163 can be introduced to the second WHR unit 165. All the shift converted syngas via line 161 can be introduced to the heat exchanger 115 or to the second WHR unit 165. As illustrated, the first cooled shift converted syngas in line 164 and the second cooled shift converted syngas in line 166 can be combined or otherwise mixed to provide a cooled shift converted syngas via line 167.

Referring again to the one or more shift converter systems 160, the shift converter system 160 can adjust the hydrogen to carbon monoxide ratio ("$H_2$:CO") of the syngas by converting carbon monoxide to carbon dioxide. Within the shift converter system 160, a water-gas shift reaction can react at least a portion of any carbon monoxide in the cooled syngas introduced via line 156 with water in the presence of a catalyst and/or high temperature to produce hydrogen and carbon dioxide. The shift converter system 160 can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. For example, a sorption enhanced water-gas shift ("SEWGS") process, utilizing a pressure swing adsorption unit having multiple fixed bed reactors packed with shift catalyst and high temperature (around 475° C.) carbon dioxide adsorbent, can be used.

The shift converter system 160 can include two or more reactors arranged in series and/or parallel. The shift converter system 160 can include one or more HTSCs, one or more medium temperature shift converters ("MTSC"), one or more low temperature shift converters ("LTSC"), or any combination thereof. At least a portion of the cooled syngas via line 156 can be introduced to one or more HTSCs, MTSCs, and/or LTSCs in any order and/or combination thereof.

The shift converted syngas in line 161 can contain less carbon monoxide than the cooled syngas in line 156. The shift converted syngas in line 161 can contain about 5 mol % or less dry basis carbon monoxide, about 3 mol % or less dry basis carbon monoxide, about 2 mol % dry basis or less carbon monoxide, about 1 mol % or less dry basis carbon monoxide, or about 0.5 mol % dry basis or less dry basis carbon monoxide.

The cooled syngas via line 156 can be apportioned equally or unequally to any one or more of the HTSCs, MTSCs, LTSCs. For example, about 75 vol % of the cooled syngas via line 156 can be introduced to a HTSCs and about 25% can be introduced to a MTSC. The converted syngas from the HTSC and the MTSC can then be introduced to the one or more heat exchangers 115 and/or second WHR units 165.

The one or more HTSCs, MTSCs, and/or LTSCs can contain one or more catalysts. The one or more HTSCs, MTSCs, and LTSCs can convert carbon monoxide in the cooled syngas in line 156 to carbon dioxide by reacting the carbon monoxide in the presence of one or more catalysts within in the one or more HTSCs, MTSCs, and/or LTSCs, at a temperature sufficient to oxidize the carbon monoxide. The catalyst within the one or more HTSCs can include, but is not limited to, iron oxide, zinc ferrite, magnetite, chromium oxides, derivatives thereof, or any combination thereof. The one or more HTSCs can be operated at a temperature of from about 325° C. to about 550° C., or from about 380° C. to about 450° C. The catalyst within the one or more MTSCs can include, but is not limited to, iron oxide, chromium oxide, derivatives thereof, or any combination thereof. The one or more MTSCs can be operated at a temperature of from about 250° C. to about 300° C. The catalyst within the one or more LTSCs can include, but is not limited to, copper, zinc, copper promoted chromia, derivatives thereof, or any combination thereof. The one or more LTSC can be operated at a temperature from about 180° C. to about 220° C.

Referring again to the cooled shift converted syngas via line 167 the cooled shift converted syngas via line 167 can be introduced to the one or more syngas purification systems 170. The syngas purification system 170 can include, but is not limited to, one or more carbon dioxide removal systems, methanators, driers, or any combination thereof. The cooled shift converted syngas can be introduced via line 167 to the one or more carbon dioxide removal systems to remove at least a portion of the carbon dioxide.

The one or more carbon dioxide removal systems within the syngas purification system 170 can selectively separate carbon dioxide from the cooled shift converted syngas to produce a carbon dioxide lean syngas and carbon dioxide. The carbon dioxide lean syngas can be introduced to the one or more methanators within the purification system 170 to convert at least a portion of any carbon monoxide and/or carbon dioxide to methane and water. For example, the methanator can convert most, e.g. greater than about 50%, of the carbon monoxide and/or carbon dioxide to methane and water. The methanator can provide a syngas having a total carbon monoxide and carbon dioxide concentration of less than about 20 ppm carbon monoxide and carbon dioxide, less than about 15 ppm carbon monoxide and carbon dioxide or less, or about 5 ppm carbon monoxide and carbon dioxide or less, or about 2 ppm carbon monoxide and carbon dioxide or less.

The syngas lean in carbon monoxide and carbon dioxide can also be introduced to the one or more optional driers within the purification system 170 to provide a syngas having a reduced amount of water. The one or more driers can remove or separate at least a portion of any water in the carbon monoxide and carbon dioxide lean syngas to provide a dried syngas. In another example, the one or more dries can remove or separate most, e.g. greater than about 50%, of the water from the carbon monoxide and carbon dioxide lean syngas.

The purification system 170 can provide a syngas via line 174 which can have a hydrogen concentration ranging from a low of about 40 mol %, about 50 mol %, or about 55 mol % to a high of about 75 mol %, about 80 mol %, or about 85 mol %. The syngas in line 174 can have a nitrogen concentration ranging from a low of about 10 mol %, about 20 mol %, or about 25 mol % to a high of about 40 mol %, about 45 mol %, or about 50 mol %. The syngas in line 174 can have a carbon dioxide concentration of less than about 3 mol %, less than about 2 mol %, less than about 1 mol %, or less than about 0.5 mol %. The syngas in line 174 can have a carbon monoxide concentration of less than about 3 mol %, less than about 2 mol %, less than about 1 mol %, or less than about 0.5 mol %. The syngas in line 174 can have a methane concentration of less than about 3 mol %, less than about 2 mol %, less than about 1 mol %, or less than about 0.5 mol %. The syngas in line 174 can have an argon concentration ranging from a low of about 0.1 mol %, about 0.5 mol %, or about 0.75 mol % to a high of about 1 mol %, about 1.5 mol %, or about 2 mol %. The hydrogen to nitrogen ($H_2:N_2$) molar ratio can range from about 1.5:1 to about 5:1, from about 2:1 to about 4:1, or from about 2.2:1 to about 3.2:1. The $H_2:N_2$ molar ratio can be about 2.8:1, about 2.9:1, about 3:1, about 3.1:1, about 3.2:1.

The one or more carbon dioxide removal systems can include any one or a combination of physical, mechanical, electrical and/or chemical systems configured in series, parallel, or any combination thereof. The one or more carbon dioxide removal systems can include one or more physical separation systems including, but not limited to, membrane type systems and solvent based systems. For example, the one or more carbon dioxide removal systems can include, but are not limited to, absorbtion/desorption type, solvent-based systems. The carbon dioxide removal system can contact the syngas introduced thereto with one or more absorbents to remove at least a portion of the carbon dioxide. Carbon dioxide selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol® process), n-methyl-pyrrolidone, sulfolane, and use of the Sulfinol® Gas Treatment Process.

The one or more methanators can include any one or a combination of physical, mechanical, electrical and/or chemical systems to convert carbon monoxide and carbon dioxide to methane, configured either in series, parallel, or any combination thereof. The one or more methanators can be a catalytic process operating at a temperature sufficient for converting or reacting at least a portion of any carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator can operate at a temperature of from about 200° C. to about 400° C.

The one or more driers can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The syngas via line 174 can be introduced to the one or more compressors 175 to provide a compressed syngas via line 176. The pressure of the compressed syngas in line 176 can range from about 6,000 kPa, about 8,000 kPa, or about 10,000 kPa to a high of about 17,000 kPa, about 20,000 kPa, or about 25,000 kPa. The compressor 175 can be any suitable type of compressor or combination of compressors. For example, the compressor 175 can be a single stage compressor, a dual stage compressor, or the like.

The compressed syngas via line 176 can be introduced to the ammonia synthesis unit 180 to provide an ammonia product via line 181 and a purge gas via line 182. The ammonia synthesis unit 180 can include one or more ammonia converters and one or more ammonia condensers (not shown). At least a portion of the nitrogen and hydrogen present in the compressed syngas can combine to provide an ammonia converter product (not shown). The ammonia converter product can have an ammonia concentration ranging from a low of about 5 mol %, about 10 mol %, or about 15 mol % to a high of about 25 mol %, or about 30 mol %. For example, the ammonia concentration of the ammonia converter product can range from a low of about 12 mol %, about 14 mol %, or about 16 mol % to a high of about 22 mol %, about 24 mol %, or about 26 mol %. The hydrogen concentration of the ammonia converter product can range from a low of about 50 mol %, about 55 mol %, or about 60 mol % to a high of about 70 mol %, about 75 mol %, or abut 80 mol %. The nitrogen concentration of the ammonia converter product can range from a low of about 15 mol %, about 20 mol %, or about 25 mol % to a high of about 30 mol %, about 35 mol %, about 40 mol %, or more than abut 40 mol %.

The one or more ammonia converters can be conventional single or multi-pass converters using one or more magnetite catalysts. The one or more ammonia converters can be single or multi-pass converters using one or more noble metal catalysts, or one or more catalysts based upon ruthenium, such as the ruthenium-based KAAP catalyst available from Kellogg Brown and Root LLC.

The one or more ammonia converters can include any reactor intended to operate at elevated pressures and/or temperatures to convert at least a portion of a feed gas containing nitrogen and hydrogen, e.g. the compressed syngas in line 176, to ammonia. The one or more ammonia converters can include one or more "Split-Flow Ammonia Converters," as discussed and described in U.S. Pat. No. 7,081,230, which is incorporated by reference herein. The one or more ammonia converters can include one or more "Isothermal Ammonia Converters," as discussed and described in U.S. Pat. No. 6,171,570, which is incorporated by reference herein. The one or more ammonia converters can include one or more "Horizontal Ammonia Converter Adapted for High Activity Catalyst," as discussed and described in U.S. Pat. No. 6,132,687, which is incorporated by reference herein. The one or more ammonia converts can include one or more ammonia converters as discussed and described in U.S. Patent Application Publication No.: 2009/0136391, which is incorporated by reference herein.

The ammonia converter product can be introduced to the one or more ammonia condensers. The one or more ammonia condensers can condense and separate the ammonia to provide the ammonia product via line 181 and the purge gas via line 182. The ammonia product via line 181 can contain, but is not limited to, ammonia, hydrogen, and nitrogen. The ammonia product in line 181 can contain a minimum of about 85 wt %, a minimum of about 90 wt %, a minimum of about 95 wt %, or a minimum of 99.9 wt % ammonia. The ammonia product via line 181 can contain a maximum of about 15 wt %, about 10 wt %, about 5 wt % or about 0.1 wt % of combined hydrogen and nitrogen.

The one or more ammonia condensers can include any mechanical or chemical system capable of selectively separating ammonia from a gas mixture including at least hydrogen and nitrogen. The one or more ammonia condensers can include one or more cryogenic purifiers containing one or more refrigeration exchangers and one or more refrigeration compressors.

The purge gas via line 182 can be introduced to an optional purge gas recovery unit 185. The purge gas in line 182 can have a hydrogen concentration ranging from a low of about 35 mol %, about 40 mol %, or about 45 mol % to a high of about 60 mol %, about 65 mol %, or about 70 mol %. The purge gas in line 182 can have a methane concentration ranging from a low of about 2 mol %, about 4 mol %, or about 6 mol % to a high of about 15 mol %, about 17 mol %, or about 20 mol %. The purge gas in line 182 can have a nitrogen concentration ranging from a low of about 18 mol % or about 20 mol % to a high of about 23 mol % or about 25 mol %. The purge gas in line 182 can have an argon concentration ranging from a low of about 2 mol %, about 3 mol %, or about 4 mol % to a high of about 5 mol %, or about 6 mol %. The purge gas recovery unit 185 can recover at least a portion of any hydrogen from the purge gas.

The off gasses via line 186 from the purge gas recovery unit 185 can be introduced to an optional argon recovery unit 190 to provide a separated argon feed via line 192 and an argon-lean purge gas via line 191. Hydrogen rich product can be recovered from the purge gas recovery unit 185, which can be recycled to the ammonia synthesis unit 185 (not shown). The argon-lean purge gas via line 191 can be recycled to one or more feeds with the system 100. Separated or recovered argon via line 192 can be vented to the atmosphere, sold as a by-product, or otherwise disposed. As illustrated, the hydrogen, methane, and some residual argon via line 191 can be recycled to the first hydrocarbon in line 106 and/or the second hydrocarbon in line 108. The argon recovery unit 190 can be eliminated and the purge gas via line 186 can be introduced to line 191.

Any portion of the purge gas in line 191 can be recycled to the first hydrocarbon in line 106 and/or the second hydrocarbon in line 108 and/or as low grade fuel in line 103. About 50% or more, about 60% or more, about 70% or more, about 80% or more, about 90% or more, or about 100% of the purge gas in line 191 can be recycled to the second hydrocarbon in line 108. About 50% or more, about 60% or more, about 70% or more, about 80% or more, about 90% or more, or about 100% of the purge gas in line 191 can be recycled to the first hydrocarbon in line 106. About 50% or more, about 60% or more, about 70% or more, about 80% or more, about 90% or more, or about 100% of the purge gas in line 191 can be introduced to line 103 and used as low grade fuel for the first reformer 130. About 50% or more, about 60% or more, about 70% or more, about 80% or more, about 90% or more, or about 100% of the purge gas in line 191 can be recycled to the first hydrocarbon in line 106, the second hydrocarbon in line 108, the low grade fuel in line 103, or any combination thereof.

In at least one specific embodiment, at least a portion of the purge gas via line 191 can be introduced to or used as the low grade fuel introduced via line 103 to the first reformer 130. About 60% to about 80% of the purge gas in line 191 can be mixed with the first hydrocarbon in line 106 and/or the second hydrocarbon in line 108 and about 20% to about 40% of the purge gas in line 191 can be used as a fuel, such as the low grade fuel introduced via line 103 to the first reformer 130. Recycling at least a portion of the purge gas in line 191 to the first hydrocarbon in line 106 and/or the second hydrocarbon in line 108 can recover methane and/or hydrogen from the purge gas, which can be used for the production of ammonia or other products. Furthermore, combusting about 20% to about 40% of the purge gas in line 191 can reduce or prevent accumulation of argon within the system 100, which can reduce or eliminate the need for the argon recovery unit 190. Likewise, recovering argon via line 192 from the argon recovery unit 190 can allow complete recycle of the purge gas via line 191 to the first hydrocarbon in line 106 and/or the second hydrocarbon in line 108, which can increase the amount of recovered methane and hydrogen that can be converted to ammonia and/or other products. Another benefit of recycling the purge gas via line 191 to the first hydrocarbon in line 106 and/or the second hydrocarbon in line 108 is that an increased hydrogen concentration in the first hydrocarbon feed 106 and/or the second hydrocarbon feed 108 requires less heating duty from the first reformer 130 to preheat the second hydrocarbon feed 106 and/or to partially reform the first hydrocarbon feed introduced to the first reformer via line 117.

A steam network 195 can produce and/or provide and/or direct and/or control the distribution of steam throughout the system 100. Steam can be produced within process waste heat boilers in the system, which can then be superheated in WHR unit 155. The superheated steam produced within the WHR unit 155 can be further superheated via line 105 in the coil 137, which can be introduced to the steam network 195 via line 107. Any type of steam or combination of types of steam can be superheated in the coil 137 and in the heat exchanger part of the WHR unit 155 (not shown). For example, medium pressure steam, high pressure steam, superheated medium pressure, steam, superheated high pressure steam, or combinations thereof can be superheated in the heating coil 137. For multiple types of steam multiple heating coils 137 can be disposed within the exhaust duct 132 of the first reformer 130, each heating coil 137 having a steam recovery line 105.

The steam network 195 can introduce the steam via one or more steam distribution lines 196 to various systems or units of the system 100. For example, steam via line 196 can be introduced to drive compressor turbines. At least a portion of the source of steam production can be or include the WHR units 155, 165. Other WHR units can in the system 100 can also be used to produce at least a portion of the steam. For example a WHR unit within the ammonia synthesis unit 180 (not shown) can produce at least a portion of the steam. In at least one specific embodiment, a majority of the steam introduced to the steam network 195 can be provided from the WHR units 155 and/or 165 and/or a WHR unit in the ammonia synthesis unit 180.

The steam network 195 can also include one or more supplemental fired boilers for producing steam necessary for the system 100, for example during startup or changes to the process, for example feed inputs are changed. The steam network 195 can include one or more boilers for producing steam necessary for the system 100 to have sufficient steam for the various systems and units of the system 100. In other words, one or more boilers can be continuously operated to produce steam for the system 100.

In one or more embodiments, one or more outside sources 197 can be used to provide additional steam via line 198 to the steam network 195. For example, the outside source 197 can be or include one or more nuclear fission and/or nuclear fusion plants that can provide steam via line 198 to the steam network 195 and/or directly to one or more various units of the system 100 (not shown). Other outside sources 197 can include, but are not limited to, steam generation plants that generate steam via the combustion of one or more materials. For example, coal fired boilers, biomass fired boilers, petroleum coke fired boilers, and the like can be used to generate steam that can be introduced via line 198 to the steam network 195 and/or directly to one or more various units of the system 100. In one or more embodiments, the outside source 197 can provide electricity to the system 100. For example, the outside source 197 can be or include one or more nuclear fission and/or nuclear fusion plants that can produce electricity that can be supplied to the system 100. Other suitable sources of electricity can include any electric power generation facility such as a wind turbine plant, conventional electric power generation plants that combust hydrocarbons to generate steam used in steam turbines, and the like.

Figure 2:
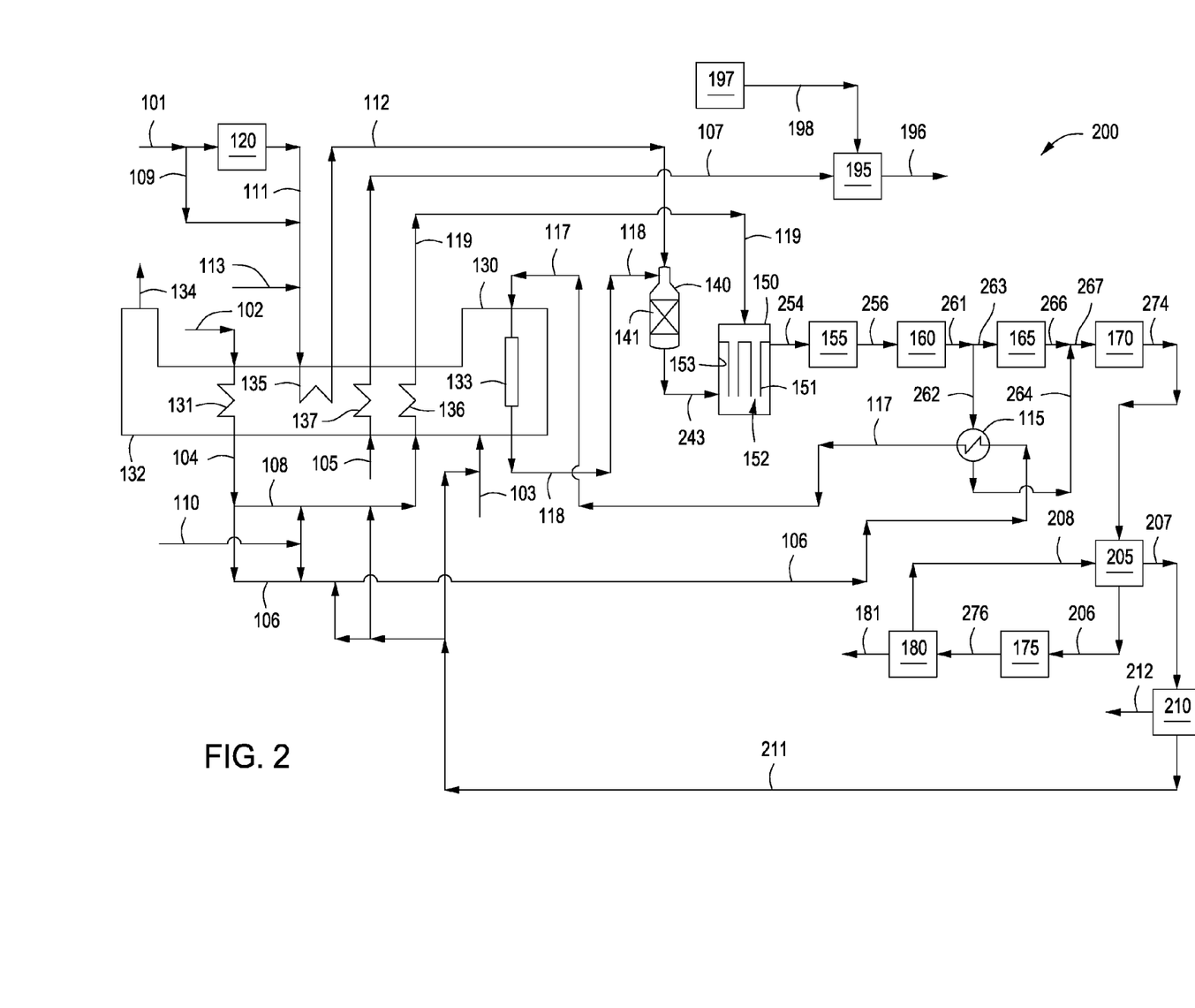
FIG. 2 depicts another illustrative system for producing syngas and ammonia, according to one or more embodiments described.

FIG. 2 depicts an illustrative system 200 for producing syngas and ammonia therefrom, according to one or more embodiments. The system 200 can include the one or more first reformers 130, ATRs 140, and reforming exchangers 150, which can be as discussed and described above with reference to FIG. 1. The system 100 can also include the one or more heat exchangers 115, waste heat recovery ("WHR") units (two are shown 155, 165), shift converter systems 160, syngas purification systems 170, compressors 175, ammonia synthesis units 180, and steam networks 195, which can be as discussed and described above with reference to FIG. 1. The system 200 can further include one or more purifiers 205, which, as shown, can be disposed between and in fluid communication with the syngas purification system 170 and the compressor 175. In another example, the one or more purifiers 205 can be disposed between the compressor 175 and the ammonia synthesis unit 180. The system 200 can further include an optional argon and/or nitrogen removal system 210, which can be in fluid communication with a waste gas provided via line 207 from the purifier 205. In the system 200, the air absorption unit 120 in the system 100 discussed and described above with reference to FIG. 1, can be eliminated and air without oxygen enrichment via line 101 can be introduced to the ATR 140. The system 200 can include the air absorption unit 120, which can be as discussed and described above with reference to FIG. 1.

The first reformed hydrocarbon in line 118 can be as discussed and described above with reference to FIG. 1. However, introducing air via line 101 to the ATR, or heated air via line 112, which can be heated via the heating coil 135 disposed in the exhaust duct 132 of the first reformer 130, can provide a second reformed hydrocarbon via line 243 provided from the ATR 140 having different concentrations or amounts of components. For example, using air as the oxidant can increase the nitrogen concentration of the second reformed hydrocarbon provided via line 243 from the ATR 140.

The second reformed hydrocarbon in line 243 can have a hydrogen concentration ranging from a low of about 40 mol %, about 45 mol %, about 47 mol %, or about 49 mol % to a high of about 51 mol %, about 53 mol %, about 55 mol %, or about 60 mol %. The second reformed hydrocarbon in line 243 can have a carbon monoxide concentration ranging from a low of about 9 mol % or about 10 mol % to a high of about 11 mol % or about 12 mol %. The second reformed hydrocarbon in line 243 can have a carbon dioxide concentration ranging from a low of about 6 mol % or about 7 mol % to a high of about 8 mol %, or about 9 mol %. The second reformed hydrocarbon in line 243 can have a nitrogen concentration ranging from a low of about 28 mol %, about 29 mol %, or about 30 mol % to a high of about 33 mol %, about 34 mol %, or about 35 mol %. The second reformed hydrocarbon in line 243 can have a methane concentration of less than about 10 mol %, about 8 mol %, about 6 mol %, about 4 mol %, about 2 mol %, less than about 1.8 mol %, less than about 1.5 mol %, less than about 1 mol %, less than about 0.5 mol %, or less than about 0.3 mol %. For example, the methane concentration of the second reformed hydrocarbon in line 243 can range from about 0.5 mol % to about 1 mol % or from about 0.6 mol % to about 1.6 mol %. In at least one specific embodiment, the second reformed hydrocarbon in line 243 can have a hydrogen concentration of from about 47 mol % to about 53 mol %, a carbon monoxide concentration of from about 10 mol % to about 11 mol %, a carbon dioxide concentration of from about 7 mol % to about 9 mol %, a nitrogen concentration of about 29 mol % to about 32 mol %, and a methane concentration of less than about 1 mol %.

The second reformed hydrocarbon in line 243 can have a temperature ranging from a low of about 900° C., about 950° C., or about 1,000° C. to a high of about 1,050° C., about 1,075° C., or about 1,100° C. The pressure of the second reformed hydrocarbon in line 243 can range from a low of about 700 kPa, about 1,000 kPa, or about 1,400 kPa to a high of about 4,000 kPa, about 5,000 kPa, or about 6,000 kPa.

The second reformed hydrocarbon via line 243 can be introduced to the shell-side 153 of the reforming exchanger 150 and mixed with the third reformed hydrocarbon within the shell-side 153 of the reforming exchanger 150 to provide a mixed reformed hydrocarbon product or syngas product. As discussed and described above, the third reformed hydrocarbon and the second reformed hydrocarbon can remain separated, i.e. independent from one another. As discussed and described above, the third reformed hydrocarbon and the second reformed hydrocarbon can be mixed with one another outside the reforming exchanger 150.

Heat required for endothermic reforming reactions within the catalyst-containing tubes 151 of the reforming exchanger 150 can be provided from the second reformed hydrocarbon introduced via line 243. The second reformed hydrocarbon introduced via line 243, either alone or as a mixed reformed hydrocarbon, can flow along the outside of the one or more catalyst-containing tubes 151, thereby indirectly transferring heat from the second reformed hydrocarbon to the second hydrocarbon introduced via line 119 to the reforming exchanger 150.

The syngas via line 254 can have a temperature ranging from a low of about 650° C., about 660° C., or about 670° C. to a high of about 775° C., about 800° C., or about 825° C. The syngas in line 254 can have a hydrogen concentration ranging from a low of about 45 mol % or about 47 mol % to a high of about 52 mol %, about 55 mol %, or about 60 mol %. The syngas in line 254 can have a carbon monoxide concentration ranging from a low of about 9 mol % or about 10 mol % to a high of about 11 mol % or about 12 mol %. The syngas in line 254 can have a carbon dioxide concentration ranging from a low of about 5 mol % or about 6 mol % to a high of about 8 mol % or about 10 mol %. The syngas in line 254 can have a nitrogen concentration ranging from a low of about 28 mol % or about 29 mol % to a high of about 31 mol % or about 32 mol %. The syngas in line 254 can have a methane concentration of less than about 10 mol %, less than about 8 mol %, less than about 5 mol %, less than about 3 mol %, less than about 2 mol %, less than about 1 mol %, or less than about 0.5 mol %. For example, the methane concentration of the syngas in line 254 can range from about 0.3 mol % to about 2 mol %.

The syngas via line 254 can be introduced to the first WHR unit 155 to provide a cooled syngas via line 256. The cooled syngas via line 256 can be introduced to the shift converter 160 to provide a shift converted syngas via line 261. In at least one specific embodiment, at least a portion of the shift converted syngas in line 261 can be introduced via line 262 to the heat exchanger 115 to provide a cooled syngas via line 264 and a heated first hydrocarbon via line 117. At least a portion of the shift converted syngas via line 263 can be introduced to the WHR unit 165 to provide a cooled syngas via line 266. The cooled syngas in line 266 and/or the cooled syngas in line 264 can be introduced via line 267 to the syngas purification system 170. The syngas purification unit 170 can remove carbon dioxide and/or water, as discussed and described above with reference to FIG. 1. A syngas via line 274, similar to the syngas provided via line 174, as discussed and described above with reference to FIG. 1 can also be recovered from the syngas purification unit 170. However, the syngas in line 274 which can have different concentrations of components therein. For example, using air as the oxidant can increase the nitrogen concentration in the syngas in line 274. The syngas in line 274 can have a hydrogen concentration ranging from a low of about 55 mol %, about 57 mol %, or about 59 mol % to a high of about 61 mol %, about 63 mol %, or about 65 mol %. The syngas in line 274 can have a nitrogen concentration ranging from a low of about 35 mol % or about 37 mol % to a high of about 38 mol % or about 40 mol %. The syngas in line 274 can have a methane concentration of less than about 4 mol %, less than about 3 mol %, less than about 2 mol %, less than about 1 mol %, or less than about 0.9 mol %. The syngas in line 274 can have an argon concentration ranging from a low of about 0.1 mol %, about 0.5 mol %, or about 0.75 mol % to a high of about 1 mol %, about 1.5 mol %, or about 2 mol %. The hydrogen to nitrogen ($H_2:N_2$) molar ratio can range from about 1.5:1 to about 2.2:1 or from about 1.6:1 to about 1.75:1.

The syngas via line 274 can be introduced to the purifier 205 to provide a purified syngas via line 206 and a waste gas via line 207. The purifier 205 can remove one or more contaminants, such as excess nitrogen, argon, oxygen, and methane to provide a contaminant-lean syngas mixture or purified syngas via line 206. The purifier 205 can be used to remove or separate at least a portion of any contaminants, including excess nitrogen, i.e. nitrogen in excess of that necessary to provide a $H_2:N_2$ molar ratio of from about 2.2:1 to about 3:1, from the syngas introduced via line 274. The purifier 205 can include one or more cryogenic-type separators operating at a temperature less than −175° C. The one or more contaminants and/or excess nitrogen can be removed from the purifier 205 as the waste gas via line 207.

The $H_2:N_2$ molar ratio of the purified syngas in line 206 can range from about 2:1 to about 4:1, or from about 2.2:1 to about 3.2:1. For example, the $H_2:N_2$ molar ratio can be about 2.9:1, about 3:1, about 3.1:1, or about 3.2:1. The hydrogen concentration in the purified syngas in line 206 can range from a low of about 70 mol %, about 72 mol % or about 74 mol % to a high of about 76 mol %, about 78 mol %, or about 80 mol %. The nitrogen concentration in the purified syngas in line 206 can range from a low of about 22 mol % or about 24 mol % to a high of about 26 mol % or about 28 mol %. The methane concentration in the purified syngas in line 206 can range from less than about 1 ppm up to about 1,000 ppm. The argon concentration in the purified syngas in line 206 can range from about 0.1 mol % to about 0.5 mol % or from about 0.3 mol % to about 0.4 mol %.

The purified syngas via line 206 can be introduced to the one or more compressors 175 to provide a compressed purified syngas via line 276. The compressed syngas via line 276 can be introduced to and the ammonia synthesis unit 180 to provide an ammonia product via line 181 and a purge gas via line 208, as discussed and described above with reference to FIG. 1. However, the purge gas provided via line 208 from the ammonia synthesis unit 180 can have a different composition than the purge gas provided via line 182 from the ammonia synthesis unit 180, as discussed and described above with reference to FIG. 1. The purge gas in line 208 can be recycled to the purifier 205 for hydrogen recovery.

The purge gas via line 208 provided from the ammonia synthesis unit 180 can be introduced to the purifier 205 directly or to the syngas in line 274. The purifier 205 can separate excess components, such as nitrogen, argon, oxygen, methane, or others from the purge gas introduced via line 208, which can be recovered or rejected via line 207 as the waste gas provided from the purifier 205. For example, a purge gas having composition containing about 10 mol % methane, about 8 mol % hydrogen, about 80 mol % nitrogen, and about 2 mol % argon can be separated to provide a purge gas via line 211 having a composition containing about 20 mol % methane, about 25 mol % hydrogen, about 53 mol % nitrogen, and about 2 mol % argon and a vent gas via line 212 containing the removed nitrogen and argon.

The purge gas via line 211 can be recycled to the first hydrocarbon in line 106, the second hydrocarbon in line 108, the low grade fuel in line 103, or any other process, similar to the purge gas via line 211, similar to the purge gas in line 191 discussed and described above with reference to FIG. 1.

The syngas produced via line 154, 254 from the first reformer 130, the ATR 140, and the reforming exchanger 150, as discussed and described above with reference to FIGS. 1 and 2, respectively, can be used in other processes as a fuel and/or a feed for producing one or more other products. Illustrative processes for which the hydrocarbon in line 154, 254 can be used for can be similar to the processes discussed and described in U.S. Patent Application Publication Nos.: 2009/0064582 and 2008/0275143, which are incorporated by reference herein.

The system 100 and/or the system 200 can be built as a new or grass-roots facility. In other words, the system 100 and/or the system 200 can be built from the ground up. The system 100 and/or the system 200 can be provided by modifying, retrofitting, or revamping an existing syngas production system. For example, the system 100 and/or the system 200 can be provided by revamping an existing integrated syngas and ammonia production system. An existing syngas production system that includes a traditional SMR and a secondary ATR reformer can be revamped to include the first reformer 130, the ATR 140, and the reforming exchanger 150, discussed and described above with reference to FIGS. 1 and 2. Traditional SMRs require high grade fuel, for example, hydrocarbons similar to or the same as those used as the hydrocarbon feed in line 102. Traditional SMRs require a large amount of high quality or high grade fuel, such as natural gas, that is combusted within the SMR to provide the heat necessary for the reforming reactions to occur within the one or more reforming tubes 133. However, revamping a traditional SMR or providing a new facility with the first reformer 130 reduces the need for the high quality fuel to be used as a source of heat within the SMR, thereby allowing more of the high quality hydrocarbon in line 102 to be converted to syngas via lines 154, 254, as discussed and described above with reference to FIGS. 1 and 2.

A revamped existing facility or a new facility that includes the first reformer 130, the ATR 140, and the reforming exchanger 150 can increase the syngas production via lines 154, 254 by 20% to 50%. Any syngas production system can be revamped to include the first reformer 130, the ATR 140, and the reforming exchanger 150, as discussed and described above with reference to FIGS. 1 and 2. For example, an existing SMR and ATR syngas production system that produces hydrogen, Fischer-Tropsch products, methanol, ammonia, urea, or the like, can be revamped to provide the first reformer 130, ATR 140, and reforming exchanger 150.

Embodiments of the present invention can be further described with the following simulated examples. The following two simulated process results shown in Table 1 illustrate (1) a standard process using a conventional SMR ("Conventional Primary Reformer") and (2) the standard process modified to include the first reformer 130 to operate according to one or more embodiments discussed and described above with reference to FIGS. 1 and 2 such that a low grade fuel is used to generate heat within the first reformer 130.

TABLE 1

| Reference Numeral | Design Feature | Conventional Primary Reformer | First Reformer 130 |
|---|---|---|---|
| 117 | Preheated Feed Stream Temperature, °C. | 460 to 621 | 375 to 440 |
| 118 | Outlet Reformed Gas Temperature, °C. | 690 to 860 | 590 to 640 |
| 118 | Hydrogen concentration (dry basis, mol%) | 55 to 70 | 40 to 45 |
| 118 | Methane concentration (dry basis, mol%) | 12 to 15 | 35 to 45 |
| 130 | Radiant heat duty MMBtu/hr for a 1,500 t/d ammonia plant | 350 to 425 | 90 to 120 |
| 133 | Catalyst-containing tube metal temperature, °C. | 825 to 950 | 650 to 750 |
| 130 | Heat Flux BTU/ft$^2$/hr | 20,000 to 28,000 | 6,000 to 15,000 |
| 130 | Percent of heat utilized for direct reforming reaction (radiant efficiency %) | 43 to 48 | 55 to 65 |

As shown in Table 1, the first reformed hydrocarbon via line 118 from the first reformer 130 can be at a temperature of from about 590° C. to about 640° C., which is substantially less than a traditional SMR reformed effluent. The radiant heat duty required for reforming the first hydrocarbon to provide the first reformed hydrocarbon in line 118 can be reduced from about 350 to about 425 MMBtu/hr to only about 90 to about 120 MMBtu/hr for an ammonia plant producing about 1,500 t/d ammonia. The percent of heat generated in the first reformer 130 that can be utilized for reforming the first hydrocarbon introduced via line 117 to produce the first reformed hydrocarbon via line 118 can increase from about 43-48% to about 55-65%. The increase in efficiency is due, at least in part, to the unique operating conditions of the first or "lite" reformer 130, discussed and described above with reference to FIGS. 1 and 2.

An ammonia plant can consume energy in several ways, which can primarily include (a) the process hydrocarbon in line 102, (b) the fuel energy (not shown) required for generating/supplementing steam generation for the steam network 195, (c) fuel energy for the reformer 130 via the fuel in line 103, and (d) fuel energy for generating oxygen for air enrichment or from compressing air in lines 101, 111, and/or 112.

Currently ammonia plants and other systems require natural gas and other high quality fuel sources in order to generate the required energy through the facility for the energy consumption areas (a)-(d), listed above. A revamped/modified existing facility that includes the first or lite reformer 130, the ATR 140, and the reforming exchanger 150 can use substitute, low grade fuel, as the energy source instead of natural gas and other high grade fuel sources. For example, the energy consumption areas (b), (c), and/or (d) can use substitute, low grade fuel as the energy source instead of natural gas or other high grade fuel sources with the process hydrocarbon in line 102 still including one or more higher grade fuels such as methane, natural as, and the like. As such, the low grade fuel can be any fuel source, such as locally available fuel, that can be used to generate energy, but would be unacceptable as a hydrocarbon feed source (energy consumption area (a)) for the hydrocarbon in line 102. Examples of substitute energy and/or fuel can include, but are not limited to, coal, coal gasifier product gas, pet coke, pet coke gasifier product gas, off-gases or waste gases from other hydrocarbon refining processes, steam generated using heat from a nuclear fission and/or fusion reactor, wind turbines, or the like.

A revamped/modified existing facility or a new facility that includes the first reformer 130, the ATR 140, and the reforming exchanger 150 can reduce the dependency of a syngas or ammonia generation plant on a natural gas supply. Reducing a facility's dependency on natural gas can improve product output, reduce operational costs, and/or reduce equipment size.

A revamped existing facility or a new facility that includes the first reformer 130, the ATR 140, and the reforming exchanger 150 can increase the syngas production via lines 154, 254 from about 20% to about 50%. The dependency of a syngas and/or ammonia plant's production capacity on the supply of natural gas or other high grade fuel can be reduced by 20% to 50%. The process becomes flexible in the use of the particular type of energy source for generating energy required to operate the processes. Acceptable fuel sources for generating the required energy for the process or energy carriers are increased to a number of potential sources, such as off-gases, coal, petroleum coke, steam as an energy carrier from nuclear fission or fusion reactors, or the like.

The hydrocarbon feed via line 102 for a revamped/modified existing facility or a new facility that includes the first reformer 130, ATR 140, and reforming exchanger 150 can still include the consumption of high value hydrocarbons as discussed and described above with reference to FIGS. 1 and 2. However, the consumption of high value hydrocarbons and other carbon containing fuels for other areas within systems 100 and/or 200, such as (b), (c), and (d) listed above, can be significantly reduced. For example the fuel introduced via line 103 to the first reformer 130 (area (c)) was a lower value hydrocarbon fuel. Furthermore, all or a portion of the remaining energy for the systems 100 and/or 200 required for areas (b), (c), and/or (d) can be supplied as steam generated in a nuclear reactor facility used for the generation of electric power or any other OSBL system that generates excess steam. For example, the steam can be generated in a nuclear plant that is OSBL to the systems 100 and/or 200 where heat generated by nuclear fission or fusion process is recovered through indirect heat transfer. High pressure steam at a pressure of from about 10,000 kPa to about 12,500 kPa and/or medium pressure steam at a pressure of from about 3,000 kPa to about 7,000 kPa or from about 5,000 kPa to about 7,000 kPa can be supplied to the steam network 195 of systems 100 and/or 200 to meet energy shortfalls. At least a portion of the energy requirement for systems 100 and/or 200 can also be supplied as electricity from a nuclear power plant rather than as steam to meet at least a portion of any energy shortfall of the steam network 195. Thus, by substituting the energy supply from hydrocarbon type fuel to nuclear based, the disclosed invention also can utilize locally available nuclear energy, thereby reducing $CO_2$ emissions from the syngas and ammonia plant. Reduction in $CO_2$ emissions can be beneficial to the environment and/or required in order to meet regulatory emission standards.

Embodiments of the present invention further relate to any one or more of the following paragraphs:

1. A process for reforming hydrocarbons, comprising: reforming a first hydrocarbon comprising about 65 mol % or more methane and about 30 mol % or less hydrogen in the presence of steam and one or more first catalysts in a first reformer to produce a first reformed hydrocarbon comprising from about 30 mol % to about 60 mol % methane and from about 30 mol % to about 55 mol % hydrogen; reforming the first reformed hydrocarbon in the presence of one or more second catalysts in a second reformer to produce a second reformed hydrocarbon comprising about 10 mol % or less methane and from about 40 mol % to about 60 mol % hydrogen; and reforming a second hydrocarbon comprising about 65 mol % or more methane and about 30 mol % or less hydrogen in the presence of steam and one or more third catalysts in a third reformer to produce a third reformed hydrocarbon comprising about 10 mol % or less methane and from about 45 mol % to about 80 mol % hydrogen, wherein heat from the second reformed hydrocarbon is transferred to the second hydrocarbon to support reforming of the second hydrocarbon.

2. The process according to paragraph 1, further comprising mixing the second reformed hydrocarbon and the third reformed hydrocarbon to provide a reformed product comprising about 10 mol % or less methane and from about 45 mol % to about 65 mol % hydrogen.

3. The process according to paragraphs 1 or 2, further comprising converting at least a portion of the second reformed hydrocarbon, the third reformed hydrocarbon, or both to ammonia to produce an ammonia product and a waste gas.

4. The process according to paragraph 3, further comprising recycling at least a portion of the waste gas to at least one of the first hydrocarbon, the second hydrocarbon, and a combustion burner disposed within the first reformer.

5. The process according to any of paragraphs 1 to 4, further comprising introducing a low grade fuel to a combustion burner disposed within the first reformer; and combusting the low grade fuel to generate heat within the first reformer.

6. The process according to paragraph 5, wherein the low grade fuel comprises biomass, coal, petroleum coke, off-gasses produced from the gasification of at least one of biomass, coal, and petroleum coke, a waste gas produced by converting at least a portion of the second reformed hydrocarbon, the third reformed hydrocarbon, or both to ammonia, or any combination thereof.

7. The process according to any of paragraphs 1 to 6, wherein the heat transferred from the second reformed hydrocarbon to the second hydrocarbon is indirectly transferred, and the process further comprises mixing the second reformed hydrocarbon and the third reformed hydrocarbon within the third reformer to provide a reformed product; and recovering the reformed product from the third reformer.

8. The process according to any of paragraphs 1 to 7, wherein the first reformed hydrocarbon comprises from about 40 mol % to about 50 mol % hydrogen, about 35 mol % to about 45 mol % methane, about 1 mol % to about 2 mol % carbon monoxide, and about 8 mol % to about 12 mol % carbon dioxide, and wherein the second reformed hydrocarbon comprises from about 40 mol % to about 50 mol % hydrogen, about 9 mol % to about 12 mol % carbon monoxide, about 9 mol % to about 12 mol % carbon dioxide, about 12 to about 40 mol % nitrogen, and about 0.3 mol % to about 1 mol % methane.

9. The process according to any of paragraphs 1 to 8, wherein the first reformed hydrocarbon comprises from about 40 mol % to about 50 mol % hydrogen, about 35 mol % to about 45 mol % methane, about 1 mol % to about 2 mol % carbon monoxide, and about 8 mol % to about 12 mol % carbon dioxide, and wherein the second reformed hydrocarbon comprises from about 47 mol % to about 53 mol % hydrogen, about 10 mol % to about 11 mol % carbon monoxide, about 7 mol % to about 9 mol % carbon dioxide, about 29 mol % to about 32 mol % nitrogen, and about 0.6 mol % to about 1.6 mol % methane.

10. The process according to any of paragraphs 1 to 9, wherein the first reformed hydrocarbon is at a temperature of from about 590° C. to about 640° C.

11. The process according to any of paragraphs 1 to 10, wherein reforming the first reformed hydrocarbon comprises combusting a first portion of the first reformed hydrocarbon in the presence of an oxidant to produce heat, wherein a second portion of the first reformed hydrocarbon is reformed in the presence of the heat and the one or more second catalysts.

12. The process according to any of paragraphs 1 to 11, wherein the first hydrocarbon and the second hydrocarbon have a steam-to-carbon molar ratio ranging from about 2.7 to about 3.5.

13. The process according to any of paragraphs 1 to 12, wherein the first hydrocarbon is preheated to a temperature of from about 390° C. to about 435° C. prior to introducing the first hydrocarbon to the first reformer, and wherein the first hydrocarbon comprises from about 40% to about 80% of the total amount of hydrocarbon in the first hydrocarbon and the second hydrocarbon.

14. A process for reforming hydrocarbons, comprising: reforming a first hydrocarbon comprising about 65 mol % or more methane and about 30 mol % or less hydrogen in the presence of steam and one or more first catalysts in a first reformer to produce a first reformed hydrocarbon comprising from about 30 mol % to about 60 mol % methane, from about 30 mol % to about 55 mol % hydrogen, and from about 0.5 mol % to about 5 mol % carbon monoxide; reforming the first reformed hydrocarbon in the presence of one or more second catalysts in a second reformer to produce a second reformed hydrocarbon comprising about 10 mol % or less methane, from about 40 mol % to about 60 mol % hydrogen, and from about 7 mol % to about 17 mol % carbon monoxide; reforming a second hydrocarbon comprising about 65 mol % or more methane and about 30 mol % or less hydrogen in the presence of steam and one or more third catalysts in a third reformer to produce a third reformed hydrocarbon comprising about 10 mol % or less methane, from about 45 mol % to about 80 mol % hydrogen, and from about 12 mol % to about 17 mol % carbon monoxide, wherein heat from the second reformed hydrocarbon is transferred to the second hydrocarbon to produce the third reformed hydrocarbon; mixing the second reformed hydrocarbon and the third reformed hydrocarbon to produce a mixed product comprising about 10 mol % or less methane, from about 45 mol % to about 65 mol % hydrogen, and from about 7 mol % to about 15 mol % carbon monoxide; cooling at least a portion of the mixed product to produce a cooled product; converting at least a portion of the carbon monoxide contained in the cooled product to carbon dioxide to produce a shift converted product comprising less than about 3 mol % carbon monoxide; and separating at least a portion of the carbon dioxide from the shift converted product to produce a syngas product comprising less than about 3 mol % carbon dioxide.

15. The process according to paragraph 14, further comprising converting at least a portion of the syngas product to ammonia to produce an ammonia product and a waste gas, and recycling at least a portion of the waste gas to at least one of the first hydrocarbon, the second hydrocarbon, and a combustion burner disposed within the first reformer.

16. A system for reforming hydrocarbons, comprising: a first reformer adapted to reform a first hydrocarbon comprising about 65 mol % or more methane and about 30 mol % or less hydrogen in the presence of steam and one or more first catalysts to produce a first reformed hydrocarbon comprising from about 30 mol % to about 60 mol % methane and from about 30 mol % to about 55 mol % hydrogen; a second reformer adapted to reform the first reformed hydrocarbon in the presence of one or more second catalysts to produce a second reformed hydrocarbon comprising about 10 mol % or less methane and from about 40 mol % to about 60 mol % hydrogen; and a third reformer adapted to reform a second hydrocarbon comprising about 65 mol % or more methane and about 30 mol % or less hydrogen in the presence of steam and one or more third catalysts to produce a third reformed hydrocarbon comprising about 10 mol % or less methane and from about 45 mol % to about 80 mol % hydrogen, wherein heat from the second reformed hydrocarbon is transferred to the second hydrocarbon to support reforming of the second hydrocarbon.

17. The system according to paragraph 16, further comprising a combustion burner disposed within the first reformer adapted to combust a low grade fuel to generate heat within the first reformer.

18. The system according to paragraphs 16 or 17, wherein the low grade fuel comprises biomass, coal, petroleum coke, off-gasses produced from the gasification of at least one of biomass, coal, and petroleum coke, a waste gas produced by converting at least a portion of the second reformed hydrocarbon, the third reformed hydrocarbon, or both to ammonia, or any combination thereof.

19. The system according to any of paragraphs 16 to 18, further comprising a facility located outside the system that supplies at least a portion of a steam requirement, an electricity requirement, or both to the system.

20. The system according to paragraph 19, wherein the facility comprises a nuclear fusion plant or a nuclear fission plant.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for reforming hydrocarbons, comprising:
reforming a first hydrocarbon comprising about 65 mol % or more methane and about 30 mol % or less hydrogen in the presence of steam and one or more first catalysts in a first reformer to produce a first reformed hydrocarbon comprising from about 30 mol % to about 60 mol % methane and from about 30 mol % to about 55 mol % hydrogen;
combusting a low grade fuel in the first reformer to heat the one or more first catalysts;
reforming the first reformed hydrocarbon in the presence of one or more second catalysts in a second reformer to produce a second reformed hydrocarbon comprising about 10 mol % or less methane and from about 40 mol % to about 60 mol % hydrogen; and
reforming a second hydrocarbon comprising about 65 mol % or more methane and about 30 mol % or less hydrogen in the presence of steam and one or more third catalysts in a third reformer to produce a third reformed hydrocarbon comprising about 10 mol % or less methane and from about 45 mol % to about 80 mol % hydrogen, wherein heat from the second reformed hydrocarbon is transferred to the second hydrocarbon to support reforming of the second hydrocarbon.

2. The process of claim 1, further comprising mixing the second reformed hydrocarbon and the third reformed hydrocarbon to provide a reformed product comprising about 10 mol % or less methane and from about 45 mol % to about 65 mol % hydrogen.

3. The process of claim 1, further comprising converting at least a portion of the second reformed hydrocarbon, the third reformed hydrocarbon, or both to ammonia to produce an ammonia product and a waste gas.

4. The process of claim 3, further comprising recycling at least a portion of the waste gas to at least one of the first hydrocarbon, the second hydrocarbon, and a combustion burner disposed within the first reformer.

5. The process of claim 1, further comprising:
introducing the low grade fuel to a combustion burner disposed within the first reformer;
combusting the low grade fuel to generate heat within the first reformer; and
separating a hydrocarbon into the first hydrocarbon and the second hydrocarbon.

6. The process of claim 5, wherein the low grade fuel comprises biomass, coal, petroleum coke, off-gasses produced from the gasification of at least one of biomass, coal, and petroleum coke, a waste gas produced by converting at least a portion of the second reformed hydrocarbon, the third reformed hydrocarbon, or both to ammonia, or any combination thereof.

7. The process of claim 1, wherein the heat transferred from the second reformed hydrocarbon to the second hydrocarbon is indirectly transferred, and the process further comprises mixing the second reformed hydrocarbon and the third reformed hydrocarbon within the third reformer to provide a reformed product; and
recovering the reformed product from the third reformer.

8. The process of claim 1, wherein the first reformed hydrocarbon comprises from about 40 mol % to about 50 mol % hydrogen, about 35 mol % to about 45 mol % methane, about 1 mol % to about 2 mol % carbon monoxide, and about 8 mol % to about 12 mol % carbon dioxide, and wherein the second reformed hydrocarbon comprises from about 40 mol % to about 50 mol % hydrogen, about 9 mol % to about 12 mol % carbon monoxide, about 9 mol % to about 12 mol % carbon dioxide, about 12 to about 40 mol % nitrogen, and about 0.3 mol % to about 1 mol % methane.

9. The process of claim 1, wherein the first reformed hydrocarbon comprises from about 40 mol % to about 50 mol % hydrogen, about 35 mol % to about 45 mol % methane, about 1 mol % to about 2 mol % carbon monoxide, and about 8 mol % to about 12 mol % carbon dioxide, and wherein the second reformed hydrocarbon comprises from about 47 mol % to about 53 mol % hydrogen, about 10 mol % to about 11 mol % carbon monoxide, about 7 mol % to about 9 mol % carbon dioxide, about 29 mol % to about 32 mol % nitrogen, and about 0.6 mol % to about 1.6 mol % methane.

10. The process of claim 1, wherein the first reformed hydrocarbon is at a temperature of from about 590° C. to about 640° C.

11. The process of claim 1, wherein reforming the first reformed hydrocarbon comprises combusting a first portion of the first reformed hydrocarbon in the presence of an oxidant to produce heat, wherein a second portion of the first reformed hydrocarbon is reformed in the presence of the heat and the one or more second catalysts.

12. The process of claim 1 wherein the first hydrocarbon and the second hydrocarbon have a steam-to-carbon molar ratio ranging from about 2.7 to about 3.5.

13. The process of claim 1, wherein the first hydrocarbon is preheated to a temperature of from about 390° C. to about 435° C. prior to introducing the first hydrocarbon to the first reformer, and wherein the first hydrocarbon comprises from about 40% to about 80% of the total amount of hydrocarbon in the first hydrocarbon and the second hydrocarbon.

14. A process for reforming hydrocarbons, comprising:
reforming a first hydrocarbon comprising about 65 mol % or more methane and about 30 mol % or less hydrogen in the presence of steam and one or more first catalysts in a first reformer to produce a first reformed hydrocarbon comprising from about 30 mol % to about 60 mol % methane, from about 30 mol % to about 55 mol % hydrogen, and from about 0.5 mol % to about 5 mol % carbon monoxide;
combusting a low grade fuel in the first reformer to heat the one or more first catalysts;
reforming the first reformed hydrocarbon in the presence of one or more second catalysts in a second reformer to produce a second reformed hydrocarbon comprising about 10 mol % or less methane, from about 40 mol % to about 60 mol % hydrogen, and from about 7 mol % to about 17 mol % carbon monoxide;
reforming a second hydrocarbon comprising about 65 mol % or more methane and about 30 mol % or less hydrogen in the presence of steam and one or more third catalysts in a third reformer to produce a third reformed hydrocarbon comprising about 10 mol % or less methane, from about 45 mol % to about 80 mol % hydrogen, and from about 12 mol % to about 17 mol % carbon monoxide, wherein heat from the second reformed hydrocarbon is transferred to the second hydrocarbon to produce the third reformed hydrocarbon;
mixing the second reformed hydrocarbon and the third reformed hydrocarbon to produce a mixed product comprising about 10 mol % or less methane, from about 45 mol % to about 65 mol % hydrogen, and from about 7 mol % to about 15 mol % carbon monoxide;
cooling at least a portion of the mixed product to produce a cooled product;
converting at least a portion of the carbon monoxide contained in the cooled product to carbon dioxide to produce a shift converted product comprising less than about 3 mol % carbon monoxide;
separating at least a portion of the carbon dioxide from the shift converted product to produce a syngas product comprising less than about 3 mol % carbon dioxide and
separating a hydrocarbon into the first hydrocarbon and the second hydrocarbon.

15. The process of claim 14, further comprising converting at least a portion of the syngas product to ammonia to produce an ammonia product and a waste gas, and recycling at least a portion of the waste gas to at least one of the first hydrocarbon, the second hydrocarbon, and a combustion burner disposed within the first reformer.

* * * * *